(12) United States Patent
Etgen et al.

(10) Patent No.: US 11,428,837 B2
(45) Date of Patent: Aug. 30, 2022

(54) WAVE EQUATION MIGRATION OFFSET GATHERS

(71) Applicant: BP Corporation North America Inc., Houston, TX (US)

(72) Inventors: John T. Etgen, Houston, TX (US); Imtiaz Ahmed, Katy, TX (US)

(73) Assignee: BP CORPORATION NORTH AMERICA INC., Houston, TX (US)

( * ) Notice: Subject to any disclaimer, the term of this patent is extended or adjusted under 35 U.S.C. 154(b) by 108 days.

(21) Appl. No.: 17/064,678

(22) Filed: Oct. 7, 2020

(65) Prior Publication Data

US 2021/0116592 A1  Apr. 22, 2021

Related U.S. Application Data

(60) Provisional application No. 62/915,825, filed on Oct. 16, 2019.

(51) Int. Cl.
| | | |
|---|---|---|
| *G01V 1/30* | (2006.01) | |
| *G01V 1/34* | (2006.01) | |
| *G01V 1/137* | (2006.01) | |
| *G01V 1/18* | (2006.01) | |
| *G01V 1/38* | (2006.01) | |

(52) U.S. Cl.
CPC ............ *G01V 1/306* (2013.01); *G01V 1/137* (2013.01); *G01V 1/186* (2013.01); *G01V 1/345* (2013.01); *G01V 1/3843* (2013.01); *G01V 2210/1212* (2013.01); *G01V 2210/1293* (2013.01); *G01V 2210/1423* (2013.01); *G01V 2210/64* (2013.01)

(58) Field of Classification Search
CPC .............................. G01V 1/306; G01V 1/345
See application file for complete search history.

(56) References Cited

U.S. PATENT DOCUMENTS

| | | | |
|---|---|---|---|
| 9,632,192 B2 * | 4/2017 | Baina ....................... | G01V 1/28 |
| 2014/0149046 A1 | 5/2014 | Baina et al. | |
| 2018/0106919 A1 * | 4/2018 | Giboli .................... | G01V 1/008 |

OTHER PUBLICATIONS

GCC Examination Report dated Dec. 10, 2021, for GCC Application No. 2020/40662 (3 p.).

* cited by examiner

*Primary Examiner* — Bryan Bui
(74) *Attorney, Agent, or Firm* — Conley Rose, P.C.

(57) ABSTRACT

A method includes receiving, via a processor, input data based upon received seismic data, migrating, via the processor, the input data via a pre-stack depth migration technique to generate migrated input data, encoding, via the processor, the input data via an encoding function as a migration attribute to generate encoded input data having a migration function that is non-monotonic versus an attribute related to the input data, migrating, via the processor, the encoded input data via the pre-stack depth migration technique to generate migrated encoded input data, and generating an estimated common image gather based upon the migrated input data and the migrated encoded input data. The method also includes generating a seismic image utilizing the estimated common image gather, wherein the seismic image represents hydrocarbons in a subsurface region of the Earth or subsurface drilling hazards.

16 Claims, 5 Drawing Sheets

80 — SEISMIC DATA COLLECTION
ACQUIRE SPATIALLY RELATED UNSTACKED SEISMIC DATA OVER EXPLORATION TARGET

82 — EDIT
- DEMULTIPLEX
- WAVELET SHAPING
- VIBROSEIS CORRELATION
- VERTICAL SUM, RESAMPLE, ETC.

84 — INITIAL PROCESSING
- SPECIFY SURVEY GEOMETRY
- SEPARATE SHOTS/FORM ARRAYS
- APPLY INITIAL DECONVOLUTION
- DETERMINE/APPLY FIELD STATICS
- ANALYZE AMPLITUDES
- ANALYZE VELOCITIES
- APPLY NORMAL MOVEOUT (NMO)
- SORT (E.G., INTO COMMON MIDPOINT ORDER)

86 — SIGNAL PROCESSING/ CONDITIONING/IMAGING
- DETERMINE/APPLY RESIDUAL STATICS
- DENOISE
- REMOVE MULTIPLES
- APPLY DECONVOLUTION
- FREQUENCY FILTER
- BUILD VELOCITY MODEL/TOMOGRAPY
- PRESTACK MIGRATION/IMAGING
- POST MIGRATION PROCESSING
- MUTE AND STACK

WAVE EQUATION MIGRATION OFFSET GATHERS

CROSS-REFERENCE TO RELATED APPLICATIONS

This application claims benefit of U.S. provisional patent application Ser. No. 62/915,825 filed Oct. 16, 2019, and entitled "Wave Equation Migration Offset Gathers," which is hereby incorporated herein by reference in its entirety.

BACKGROUND

The present disclosure relates generally to seismic image generation, and more specifically, to generation of migration offset gathers used in the generation of seismic images.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

A seismic survey includes generating an image or map of a subsurface region of the Earth by sending sound energy down into the ground and recording the reflected sound energy that returns from the geological layers within the subsurface region. During a seismic survey, an energy source is placed at various locations on or above the surface region of the Earth, which may include hydrocarbon deposits. Each time the source is activated, the source generates a seismic (e.g., sound wave) signal that travels downward through the Earth, is reflected, and, upon its return, is recorded using one or more receivers disposed on or above the subsurface region of the Earth. The seismic data recorded by the receivers may then be used to create an image or profile of the corresponding subsurface region.

Over time, as hydrocarbons are being extracted from the subsurface region of the Earth, the location, saturation, and other characteristics of the hydrocarbon reservoir and (e.g., overburden) within the subsurface region may change. As such, it may be useful to determine how the image or map of the subsurface region changes over time, such that the operations related to extracting the hydrocarbons may be modified to more efficiently extract the hydrocarbons from the subsurface region of the Earth.

SUMMARY

A summary of certain embodiments disclosed herein is set forth below. It may be understood that these aspects are presented merely to provide the reader with a brief summary of these certain embodiments and that these aspects are not intended to limit the scope of this disclosure. Indeed, this disclosure may encompass a variety of aspects that may not be set forth below.

Seismic imaging generally includes generation of a seismic image from seismic data (e.g., seismic waves transmitted from a source, through the ground, and received and recorded at a receiver). Seismic data may be recorded for a seismic survey of a particular geological region and may include individual seismic traces (e.g., a time series for each signal received by the receiver). The traces may be transformed to generate a seismic image of the subsurface, resulting from stacking or integrating the seismic data. One step in the transformation is migration of the data, which includes rearrangement of the data with respect to a model (e.g., a map of propagation velocity of the seismic waves) to convert the data to features in subsurface depth (e.g., to position subsurface features in their proper positions in space, laterally and vertically). Migration techniques typically include time migration (e.g., Stolt migration, finite-difference migration, etc.) and depth migration (e.g., Kirchhoff, reverse time migration (RTM), Gaussian Beam Migration, etc.).

Migration may be undertaken prior to any stacking step in the seismic imaging as a pre-stack depth migration, whereby migrated data is computed for each shot (e.g., each seismic transmission between transmitter and receiver) using a velocity model and arranged as an output having migrated features in the subsurface. The outputs for various shots may be analyzed to check for the validity of the model (which may be iteratively corrected until a threshold for quality of an image is realized). Offset gathers, such as surface offset common image gathers (CIGs) may include a gather of traces from various offsets, which may be adjusted for travel time differences from zero offset in time or depth. Surface offset CIGs may be utilized in velocity estimations and image enhancement. However, the use of surface offset CIGs in conjunction with pre-stack depth migration techniques, such as RTM (i.e., a pre-stack two-way wave-equation migration that allows for accurate imaging in and below areas with structural and/or velocity complexities), may be limited without accurate computations of surface offset CIGs. Accordingly, present embodiments include techniques that allow for computations of surface offset CIGs.

One technique to obtain surface offset CIGs for use with depth migration techniques is to compute one migration per shot and per trace. However, this includes computing migrations equal to the total number of shots times the average number of receivers per shot. Alternatively, attribute migration (double migration) might instead be applied. Attribute migration includes computation of two migrations with the same data, whereby the second migration involves a migration operator multiplied by the specular reflection angle and division of the two migrated images to result in the specular angle along the reflectors. A different technique may involve utilizing a surface offset between the source and receiver as the migration attribute in place of the specular reflection angle. This results in the generation of a monotonic function (i.e., a function that is entirely increasing or decreasing) of the attribute (e.g., the offset) versus the migration function (e.g., the migration attribute (offset) multiplied by the input data) and, more specifically, a non-decreasing monotonic function.

A further technique described herein includes the use of an encoding function (e.g., inclusive of time or time and offset values) as the migration attribute in place of the surface offset between the source and receiver and in place of the receiver specular reflection angle. This results in the generation of a non-monotonic function (i.e., a function that is not entirely non-increasing or not entirely non-decreasing) of the attribute (e.g., the offset) versus the migration function (e.g., the migration attribute (encoding function) multiplied by the input data). Use of this encoding function may result in the computation of surface offset CIGs as part of a pre-stack depth migration technique (e.g. a pre-stack wave equation migration technique, such as RTM).

BRIEF DESCRIPTION OF THE DRAWINGS

Various aspects of this disclosure may be better understood upon reading the following detailed description and upon reference to the drawings in which.

DETAILED DESCRIPTION OF SPECIFIC EMBODIMENTS

One or more specific embodiments will be described below. In an effort to provide a concise description of these embodiments, not all features of an actual implementation are described in the specification. It may be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it may be appreciated that such a development effort might be complex and time consuming, but would nevertheless be a routine undertaking of design, fabrication, and manufacture for those of ordinary skill having the benefit of this disclosure.

Seismic data may provide valuable information with regard to the description such as the location and/or change of hydrocarbon deposits within a subsurface region of the Earth. Improvements to the processing of the seismic data and subsequent image generation may be made through the use of pre-stack depth migration techniques used with surface common image gathers (CIGs), which may facilitate correction of an applied velocity model used in computing pre-stack depth migration data. These CIGs may be generated through the use of attribute migration (e.g., double migration) whereby an encoding function (e.g., inclusive of time and offset values) is utilized as a migration attribute in place of, for example, a surface offset between the source and receiver and in place of a receiver specular reflection angle. This results in the generation of a non-monotonic function (i.e., a function that is not entirely non-increasing or not entirely non-decreasing) of the attribute (e.g., the offset) versus the migration attribute (encoding function multiplied by the data). Use of this encoding function may result in the computation of surface offset CIGs as part of a pre-stack depth migration technique (e.g. a pre-stack wave equation migration technique, such as reverse time migration (RTM) technique).

Figure 1:
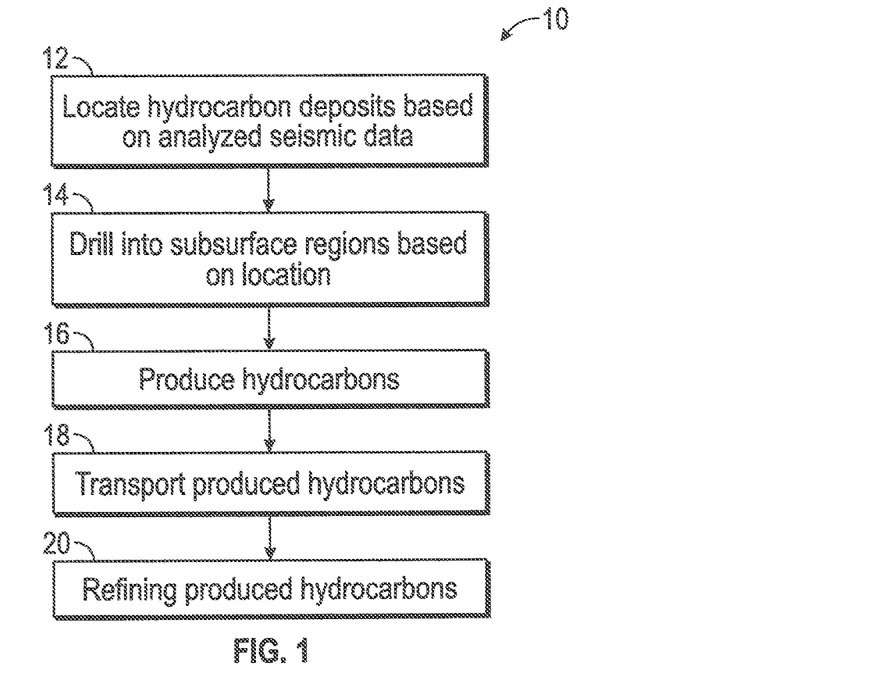
FIG. 1 illustrates a flow chart of various processes that may be performed based on analysis of seismic data acquired via a seismic survey system, in accordance with embodiments presented herein.
Figure 2:
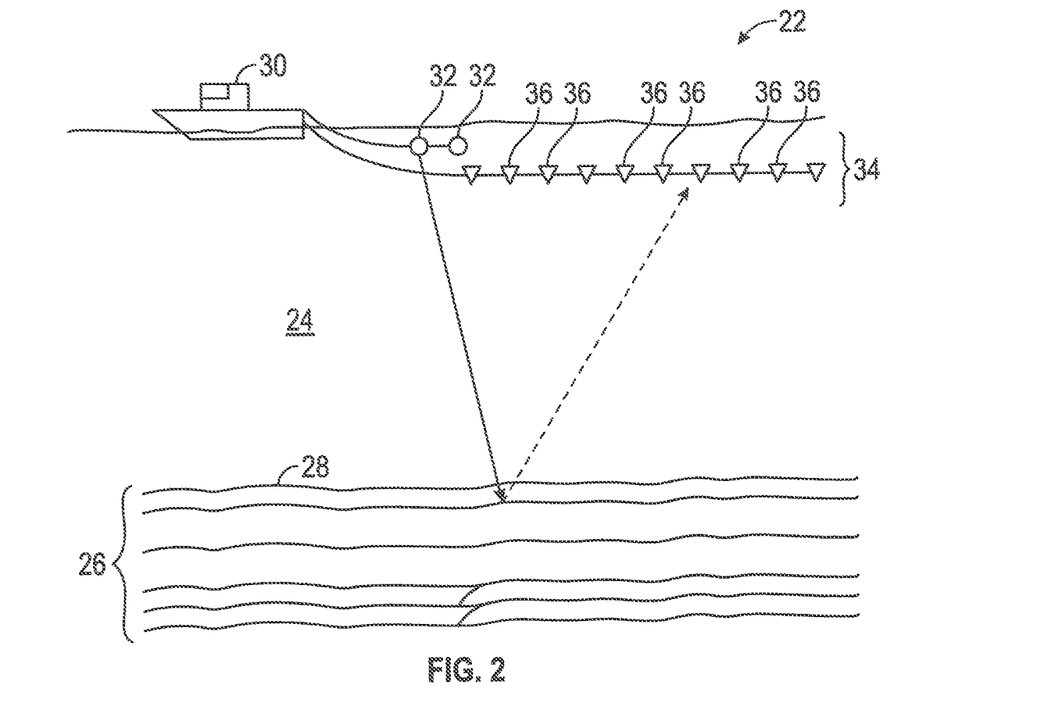
FIG. 2 illustrates a marine survey system in a marine environment, in accordance with embodiments presented herein.
Figure 3:
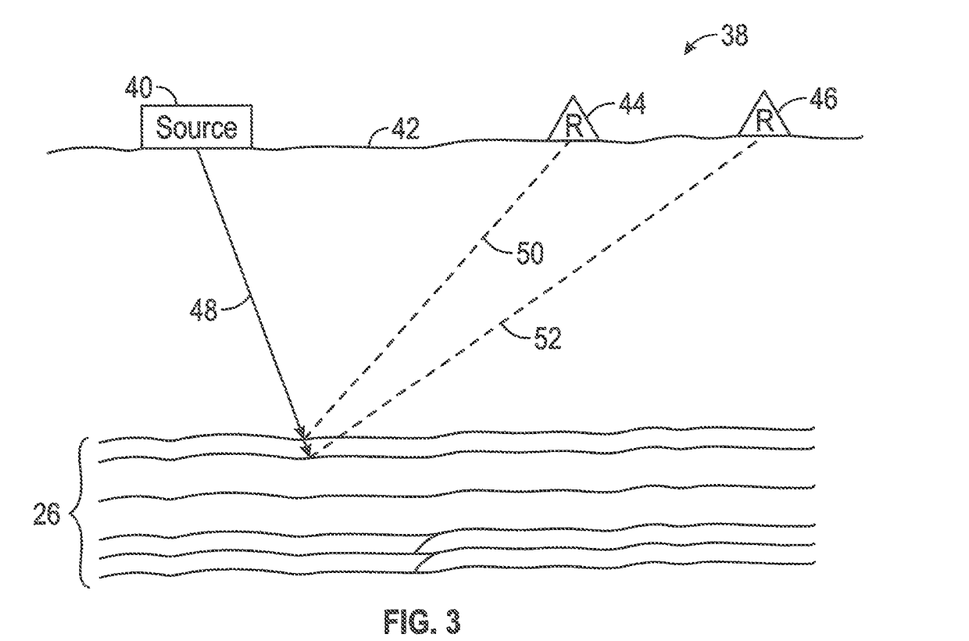
FIG. 3 illustrates a second marine survey system in a marine environment, in accordance with embodiments presented herein

By way of introduction, seismic data may be acquired using a variety of seismic survey systems and techniques, two of which are discussed with respect to FIG. 2 and FIG. 3. Regardless of the seismic data gathering technique utilized, after the seismic data is acquired, a computing system may analyze the acquired seismic data and may use the results of the seismic data analysis (e.g., seismogram, map of geological formations, etc.) to perform various operations within the hydrocarbon exploration and production industries. For instance, FIG. 1 illustrates a flow chart of a method 10 that details various processes that may be undertaken based on the analysis of the acquired seismic data. Although the method 10 is described in a particular order, it is noted that the method 10 may be performed in any suitable order.

Referring now to FIG. 1, at block 12, locations and properties of hydrocarbon deposits within a subsurface region of the Earth associated with the respective seismic survey may be determined based on the analyzed seismic data. In one embodiment, the seismic data acquired via one or more seismic acquisition techniques may be analyzed to generate a map or profile that illustrates various geological formations within the subsurface region.

Based on the identified locations and properties of the hydrocarbon deposits, at block 14, certain positions or parts of the subsurface region may be explored. That is, hydrocarbon exploration organizations may use the locations of the hydrocarbon deposits to determine locations at the surface of the subsurface region to drill into the Earth. As such, the hydrocarbon exploration organizations may use the locations and properties of the hydrocarbon deposits and the associated overburdens to determine a path along which to drill into the Earth, how to drill into the Earth, and the like.

After exploration equipment has been placed within the subsurface region, at block 16, the hydrocarbons that are stored in the hydrocarbon deposits may be produced via natural flowing wells, artificial lift wells, and the like. At block 18, the produced hydrocarbons may be transported to refineries and the like via transport vehicles, pipelines, and the like. At block 20, the produced hydrocarbons may be processed according to various refining procedures to develop different products using the hydrocarbons.

It is noted that the processes discussed with regard to the method 10 may include other suitable processes that may be based on the locations and properties of hydrocarbon deposits as indicated in the seismic data acquired via one or more seismic survey. As such, it may be understood that the processes described above are not intended to depict an exhaustive list of processes that may be performed after determining the locations and properties of hydrocarbon deposits within the subsurface region.

With the forgoing in mind, FIG. 2 illustrates a marine survey system 22 (e.g., for use in conjunction with block 12 of FIG. 1) that may be employed to acquire seismic data (e.g., waveforms) regarding a subsurface region of the Earth in a marine environment. Generally, a marine seismic survey using the marine survey system 22 may be conducted in an ocean 24 or other body of water over a subsurface region 26 of the Earth that lies beneath a seafloor 28.

The marine survey system 22 may include a vessel 30, a seismic source 32, a streamer 34, a receiver 36, and/or other equipment that may assist in acquiring seismic images representative of geological formations within a subsurface region 26 of the Earth. The vessel 30 may tow the seismic source 32 (e.g., an air gun array) that may produce energy, such as sound waves (e.g., seismic waveforms), that is directed at a seafloor 28. The vessel 30 may also tow the streamer 34 having a receiver 36 (e.g., hydrophones) that may acquire seismic waveforms that represent the energy output by the seismic sources 32 subsequent to being reflected off of various geological formations (e.g., salt domes, faults, folds, etc.) within the subsurface region 26. Additionally, although the description of the marine survey system 22 is described with one seismic source 32 (represented in FIG. 2 as an air gun array) and one receiver 36 (represented in FIG. 2 as a plurality of hydrophones), it is noted that the marine survey system 22 may include multiple seismic sources 32 and multiple seismic receivers 36. In the same manner, although the above descriptions of the marine survey system 22 is described with one seismic streamer 34, it is noted that the marine survey system 22 may include multiple seismic streamers 34. In addition, additional vessels 30 may include additional seismic sources 32, seismic streamers 34, and the like to perform the operations of the marine survey system 22.

FIG. 3 illustrates a land survey system 38 (e.g., for use in conjunction with block 12 of FIG. 1) that may be employed to obtain information regarding the subsurface region 26 of the Earth in a non-marine environment. The land survey system 38 may include a (land-based) seismic source 40 and a (land-based) seismic receiver 44. In some embodiments, the land survey system 38 may include one or more multiple seismic sources 40 and one or more seismic receivers 44 and 46. Indeed, for discussion purposes, FIG. 3 includes a seismic source 40 and two seismic receivers 44 and 46. The seismic source 40 (e.g., seismic vibrator) that may be disposed on a surface 42 of the Earth above the subsurface region 26 of interest. The seismic source 40 may produce energy (e.g., sound waves, seismic waveforms) that is directed at the subsurface region 26 of the Earth. Upon reaching various geological formations (e.g., salt domes, faults, folds) within the subsurface region 26 the energy output by the seismic source 40 may be reflected off of the geological formations and acquired or recorded by one or more land-based receivers (e.g., 44 and 46).

In some embodiments, the seismic receivers 44 and 46 may be dispersed across the surface 42 of the Earth to form a grid-like pattern. As such, each seismic receiver 44 or 46 may receive a reflected seismic waveform in response to energy being directed at the subsurface region 26 via the seismic source 40. In some cases, one seismic waveform produced by the seismic source 40 may be reflected off of different geological formations and received by different receivers. For example, as shown in FIG. 3, the seismic source 40 may output energy that may be directed at the subsurface region 26 as seismic waveform 48. A first seismic receiver 44 may receive the reflection of the seismic waveform 48 off of one geological formation and a second receiver 46 may receive the reflection of the seismic waveform 48 off of a different geological formation. As such, the seismic first receiver 44 may receive a reflected seismic waveform 50 and the second receiver 46 may receive a reflected seismic waveform 52.

Figure 4:
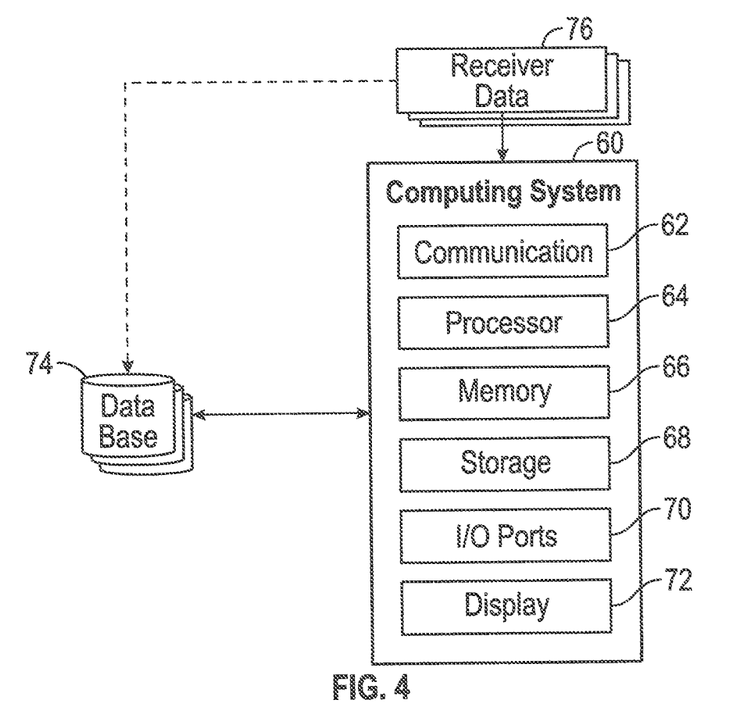
FIG. 4 illustrates a computing system that may perform operations described herein based on data acquired via the marine survey system of FIG. 2 and/or the second marine survey system of FIG. 3, in accordance with embodiments presented herein.

Regardless of how the seismic data is acquired, a computing system (e.g., for use in conjunction with block 12 of FIG. 1) may analyze the seismic waveforms acquired by the (marine-based) seismic receivers 36 or the (land-based) seismic receivers 44 and 46 to determine information regarding the geological structure, the location and property of hydrocarbon deposits, and the like within the subsurface region 26. FIG. 4 illustrates an example of such a computing system 60 that may perform various data analysis operations to analyze the seismic data acquired by the receivers 36, 44, or 46 to determine the structure of the geological formations within the subsurface region 26.

Referring now to FIG. 4, the computing system 60 may include a communication component 62, a processor 64, memory 66 (e.g., a tangible, non-transitory, machine readable media), storage 68 (e.g., a tangible, non-transitory, machine readable media), input/output (I/O) ports 70, a display 72, and the like. The communication component 62 may be a wireless or wired communication component that may facilitate communication between the receivers 36, 44, 46, one or more databases 74, other computing devices, and other communication capable devices. In one embodiment, the computing system 60 may receive receiver data 76 (e.g., seismic data, seismograms) that may have been previously acquired by seismic receivers via a network component, the database 74, or the like. The processor 64 of the computing system 60 may analyze or process the receiver data 76 to ascertain various features regarding geological formations within the subsurface region 26 of the Earth.

The processor 64 may be any type of computer processor or microprocessor capable of executing computer-executable code or instructions to implement the methods described herein. The processor 64 may also include multiple processors that may perform the operations described below. The memory 66 and the storage 68 may be any suitable articles of manufacture that can serve as media to store processor-executable code, data, or the like. These articles of manufacture may represent computer-readable media (e.g., any suitable form of memory or storage) that may store the processor-executable code used by the processor 64 to perform the presently disclosed techniques. Generally, the processor 64 may execute software applications that include programs that process seismic data acquired via receivers of a seismic survey according to the embodiments described herein.

The memory 66 and the storage 68 may also be used to store the data, analysis of the data, the software applications, and the like. The memory 66 and the storage 68 may represent tangible, non-transitory, machine-readable media non-transitory computer-readable media (e.g., any suitable form of memory or storage) that may store the processor-executable code used by the processor 64 to perform various techniques described herein. It may be noted that tangible and non-transitory merely indicates that the media is tangible and is not a signal.

The I/O ports 70 may be interfaces that may couple to other peripheral components such as input devices (e.g., keyboard, mouse), sensors, input/output (I/O) modules, and the like. I/O ports 70 may enable the computing system 60 to communicate with the other devices in the marine survey system 22, the land survey system 38, or the like via the I/O ports 70.

The display 72 may depict visualizations associated with software or executable code being processed by the processor 64. In one embodiment, the display 72 may be a touch display capable of receiving inputs from a user of the computing system 60. The display 72 may also be used to view and analyze results of the analysis of the acquired seismic data to determine the geological formations within the subsurface region 26, the location and property of hydrocarbon deposits within the subsurface region 26, and the like. The display 72 may be any suitable type of display, such as a liquid crystal display (LCD), plasma display, or an organic light emitting diode (OLED) display, for example. In addition to depicting the visualization described herein via the display 72, it may be noted that the computing system 60 may also depict the visualization via other tangible elements, such as paper (e.g., via printing) and the like.

With the foregoing in mind, the present techniques described herein may also be performed using a supercomputer that employs multiple computing systems 60, a cloud-computing system, or the like to distribute processes to be performed across multiple computing systems. In this case, each computing system 60 operating as part of a super computer may not include each component listed as part of the computing system 60. For example, each computing system 60 may not include the display 72 since the display 72 may not be useful to for a supercomputer designed to continuously process seismic data.

After performing various types of seismic data processing, the computing system 60 may store the results of the analysis in one or more databases 74. The databases 74 may be communicatively coupled to a network that may transmit and receive data to and from the computing system 60 via the communication component 62. In addition, the databases 74 may store information regarding the subsurface region 26, such as previous seismograms, geological sample data, seismic images, and the like regarding the subsurface region 26.

Although the components described above have been discussed with regard to the computing system 60, it may be noted that similar components may make up the computing system 60. Moreover, the computing system 60 may also be part of the marine survey system 22 or the land survey system 38, and thus may monitor and control certain operations of the seismic sources 32 or 40, the receivers 36, 44, 46, and the like. Further, it may be noted that the listed components are provided as example components and the embodiments described herein are not to be limited to the components described with reference to FIG. 4.

In some embodiments, the computing system 60 (and more specifically, the processor 64 operating in conjunction with at least one of the memory 66 or the storage 68) may generate a two-dimensional representation or a three-dimensional representation of the subsurface region 26 based on the seismic data received via the receivers mentioned above. Additionally, seismic data associated with multiple source/receiver combinations may be combined to create a near continuous profile of the subsurface region 26 that can extend for some distance. In a two-dimensional (2-D) seismic survey, the receiver locations may be placed along a single line, whereas in a three-dimensional (3-D) survey the receiver locations may be distributed across the surface in a grid pattern. As such, a 2-D seismic survey may provide a cross sectional picture (vertical slice) of the Earth layers as they exist directly beneath the recording locations. A 3-D seismic survey, on the other hand, may create a data "cube" or volume that may correspond to a 3-D picture of the subsurface region 26.

In addition, a 4-D (or time-lapse) seismic survey may include seismic data acquired during a 3-D survey at multiple times. Using the different seismic images acquired at different times, the computing system 60 may compare the two images to identify changes in the subsurface region 26.

In any case, a seismic survey may be composed of a very large number of individual seismic recordings or traces. As such, the computing system 60 may be employed to analyze the acquired seismic data to obtain an image representative of the subsurface region 26 and to determine locations and properties of hydrocarbon deposits. To that end, a variety of seismic data processing algorithms may be used to remove noise from the acquired seismic data, migrate the pre-processed seismic data, identify shifts between multiple seismic images, align multiple seismic images, and the like.

After the computing system 60 analyzes the acquired seismic data, the results of the seismic data analysis (e.g., seismogram, seismic images, map of geological formations, etc.) may be used to perform various operations within the hydrocarbon exploration and production industries. In some embodiments, the computing system 60 may provide an indication of the presence of hydrocarbons. As such, the computing system 60 may provide an indication of the subsurface region 26 that is likely to have hydrocarbons and provide a position (e.g., coordinates or a relative area) of regions that contain the hydrocarbon deposits and/or (in some cases) subsurface drilling hazards. In other embodiments, the image generated in accordance with the present techniques may be displayed via the display 72 of the computing system 60, thus facilitating locating a region by a user of the computing system 60. Accordingly, the acquired seismic data may be used to perform the method 78 of FIG. 5 that details an example of the various processes that may be undertaken based on the analysis of the acquired seismic data to provide a seismic data analysis.

Figure 5:
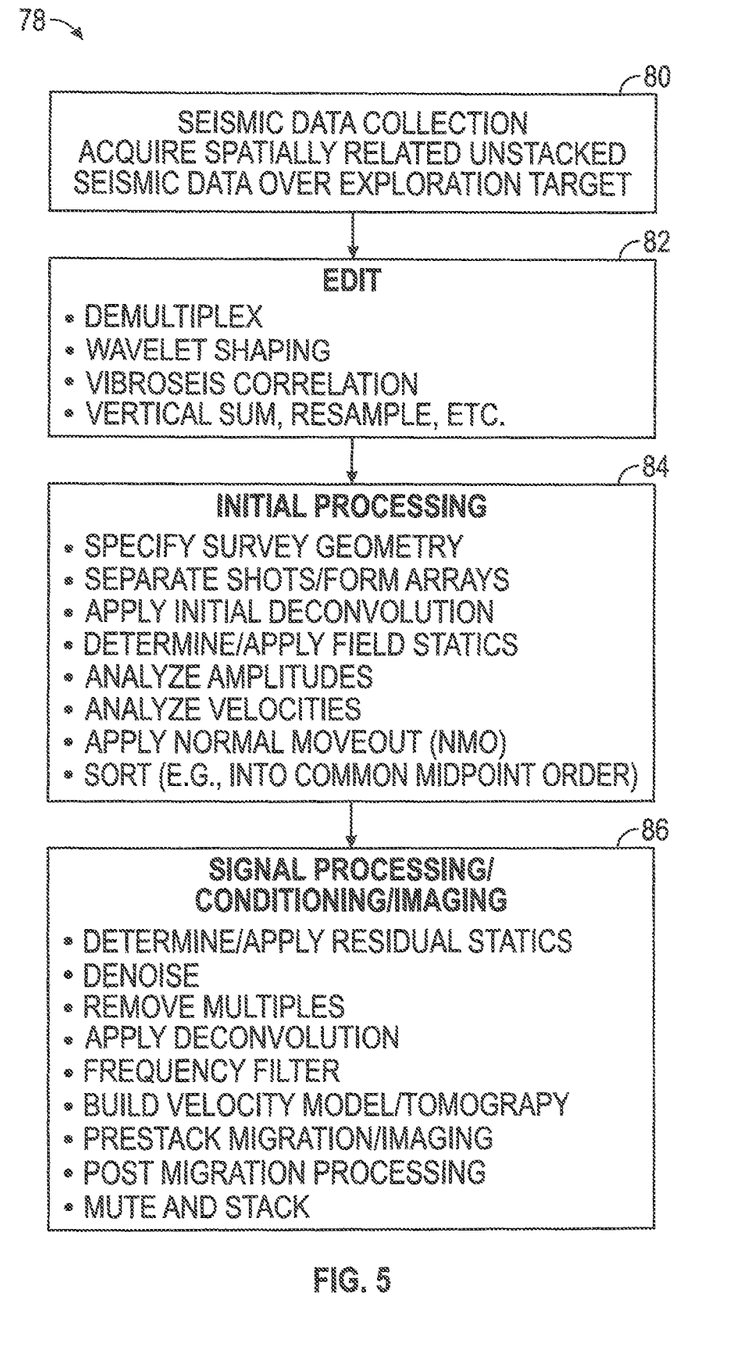
FIG. 5 illustrates a flow chart of a method for generating a seismic image via the computing system of FIG. 4, in accordance with embodiments presented herein.

In some embodiments, a seismic image may be generated in conjunction with a seismic processing scheme such as, for example, the method 78 illustrated in FIG. 5 by the computing system (and more specifically, the processor 64 operating in conjunction with at least one of the memory 66 or the storage 68). As illustrated, method 78 includes a seismic processing sequence that includes seismic data collection in step 80, editing of the seismic data in step 82, initial processing in step 84, and signal processing, conditioning, and imaging (which may, for example, include production of imaged sections or volumes) in step 86 prior to any interpretation of the seismic data, any further image enhancement consistent with the exploration objectives desired, generation of attributes from the processed seismic data, reinterpretation of the seismic data as needed, and determination and/or generation of a drilling prospect or other seismic survey applications. As a result of the method 78, location of hydrocarbons within a subsurface region 26 may be identified. Location of these hydrocarbons contained in hydrocarbon deposits may be based, at least in part, on the performance of processes in step 86, inclusive of pre-stack depth migration techniques used with surface common image gathers (CIGs), which may facilitate correction of an applied velocity model used in computing pre-stack depth migration data. As previously noted, these CIGs may be generated through the use attribute migration (e.g., double migration) whereby an encoding function is utilized as a migration attribute in place of, for example, a surface offset between the source and the receiver and in place of a receiver specular reflection angle. This results in the generation of a non-monotonic function (i.e., a function that is not entirely increasing or not entirely decreasing) of the attribute (e.g., the offset) versus the migration attribute (encoding function multiplied by the data). Use of this encoding function may result in the computation of surface offset CIGs as part of a pre-stack depth migration technique (e.g. a pre-stack wave equation migration technique, such as a RTM technique).

Figure 6:
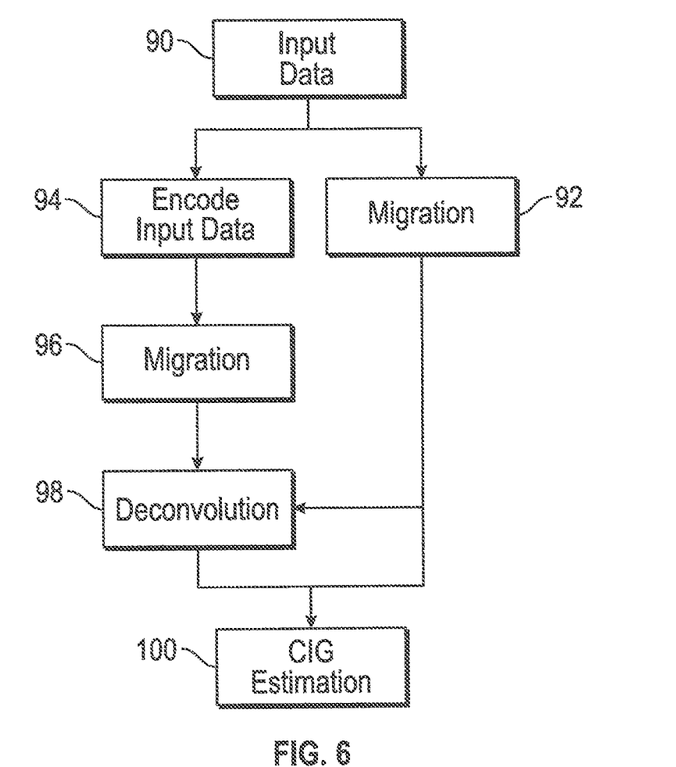
FIG. 6 illustrates a flow chart of a method for generating surface offset common image gathers via the computing system of FIG. 4, in accordance with embodiments presented herein.

FIG. 6 illustrates a method 88 for generating surface offset common image gathers via the computing system 60 (and more specifically, the processor 64 operating in conjunction with at least one of the memory 66 or the storage 68). More specifically, the method 88 includes attribute migration (e.g., double migration) whereby an encoding function is utilized as a migration attribute in place of, for example, a surface offset between the source and the receiver and in place of a receiver specular reflection angle. As illustrated in step 90, the computing system 60 may receive the input data (e.g., seismic traces based upon data collected in step 80 of FIG. 5 and corresponding to a shot from a given source to a given receiver having a distance therebetween termed an offset). In step 92, the computing system 60 may apply a pre-stack depth migration to the input data to generate migrated input data. In some embodiments, the pre-stack depth migration technique may be a RTM technique, which may be a technique based on directly solving a wave equation in the time domain (instead of in the frequency domain). RTM may be based on reversing of a forward modeling operation in which a velocity model is input, a source location is selected, the wave equation is numerically solved in incremental time steps, and wave propagation is computed in the subsurface region 26. RTM may include inputting of a wave field recorded at the surface, stepping backwards in time, and propagate seismic events to the location in the subsurface region 26 in which they were generated to generate migrated input data as a result of step 92. However, it may be appreciated that alternative techniques (e.g., Kirchhoff pre-stack depth migration, Gaussian beam migration, or wave-equation migration) for the pre-stack depth migration of step 92 may instead be implemented.

In step 94 the computing system 60 may encode the input data to generate encoded input data using, for example, an encoding function as a migration attribute in place of, for example, a surface offset between the source and receiver and in place of a receiver specular reflection angle. It is noted that step 92 may be performed prior to step 94 or, alternatively, performed at the same time as or after step 94 is performed. The encoding function may be, for example, dependent on time and may vary with offset, in contrast to a migration attribute as a simple function of space, as in the instances where the migration attribute is a surface offset between the source and receiver or when the migration attribute is a receiver specular reflection angle). That is, when the migration attribute utilized is a surface offset between the source and receiver or a receiver specular reflection angle, a smooth function of space is utilized and no function dependent on time is utilized. Advantageously, through the use of an encoding function, for example, that is dependent on time and may vary with offset, encodings in time may be accomplished and a different set of functions with respect to space (e.g., including discontinuous functions of space) relative to the migration attribute utilized as a surface offset between the source and receiver or a receiver specular reflection angle. This outcome is illustrated with respect to FIGS. 7, 8a and 8b, and 9a and 9b.

Figure 7:
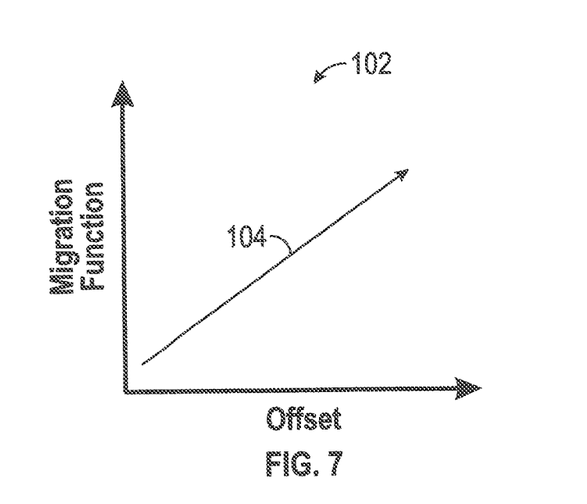
FIG. 7 illustrates a graph of a monotonic function generated by utilizing a surface offset value as the migration attribute in step 94 of FIG. 6, in accordance with embodiments presented herein.
Figure 8A:
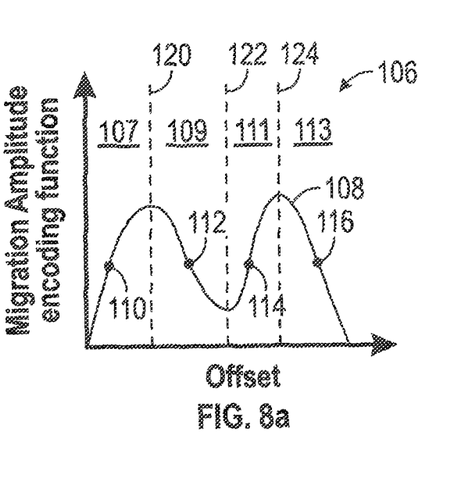
FIG. 8a illustrates a graph of a non-monotonic function generated by utilizing an amplitude and a set of time encoding functions as the migration attribute in step 94 of FIG. 6, in accordance with embodiments presented herein.

FIG. 7 illustrates a graph 102 of a monotonic function 104 generated when a surface offset value is utilized as the migration attribute in step 94 of FIG. 6. As illustrated, the monotonic function 104 is an entirely non-decreasing function with respect to the attribute (e.g., the offset) versus the migration function (e.g., the migration attribute (offset) multiplied by the input data). In contrast, FIG. 8a illustrates a graph 106 of a non-monotonic function 108 (i.e., a function that is not entirely non-increasing or not entirely non-decreasing) generated when an encoding function is utilized as the migration attribute in step 94 of FIG. 6. As illustrated, the non-monotonic function 108 is not entirely non-decreasing and not entirely non-increasing with respect to the attribute (e.g., the offset) versus the migration function (e.g., the migration attribute (the encoding function dependent on time and that varies with offset) multiplied by the input data). As further illustrated, points 110, 112, 114, and 116 of the non-monotonic function 108 represent different offset values that have a common migration function value (i.e., each of points 110, 112, 114, and 116 are illustrated as having the same amplitude encoding function); a situation that cannot be present in the monotonic function 104 of FIG. 7. In this manner, the non-monotonic function 108 (utilizing the underlying encoding function dependent on time and that varies with offset) provides for greater flexibility and robustness of functions in space, which are otherwise prohibited if the surface offset value is utilized as the migration attribute.

Figure 8B:
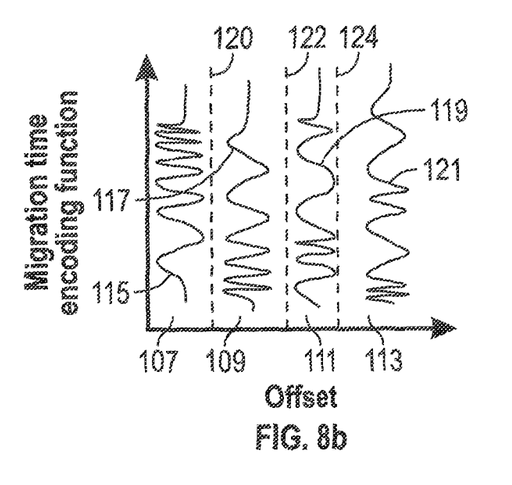
FIG. 8b illustrates a graph of a first set of time encoding functions, in accordance with embodiments presented herein.

As previously noted, points 110, 112, 114, and 116 of the non-monotonic function 108 represent different offset values that have a common migration function value. Point 110 may be binned (with additional points in region 107) and encoded using a first time-series encoding function. An example of this first time-series encoding function is illustrated in FIG. 8b as function 115. Likewise, point 112 may be binned (with additional points in region 109) and encoded using a second time-series encoding function, such as function 117 of FIG. 8b. Similarly, point 114 may be binned (with additional points in region 111) and encoded using a third time-series encoding function, such as function 119 of FIG. 8b and point 116 may be binned (with additional points in region 113) and encoded using a fourth time-series encoding function, such as function 121 of FIG. 8b. Thus, FIG. 8b illustrates separate functions 115, 117, 119, and 121 (e.g., separate time encoding functions) and each offset value of the regions 107, 109, 111, and 113 is encoded with a separate time encoding function (e.g., functions 115, 117, 119, and 121, respectively), which renders the binned data generally, and more specifically points 110, 112, 114, and 116 separable from one another. Thus, everywhere that the non-monotonic function 108 reverses slope from positive to negative or vice versa, a new time encoding function (e.g., functions 115, 117, 119, and 121, respectively) is applied. Furthermore, regions 107, 109, 111, and 113 may be separated by a respective thresholds (illustrated by the vertical lines 120, 122, and 124 of FIGS. 8a and 8b), which may represent the offset value thresholds that may be applied by the computing system 60 to determine to which offset bin input data is assigned to each respective region 107, 109, 111, and 113.

Returning to FIG. 6, in step 96, the computing system 60 may apply a pre-stack depth migration to the encoded input data to generate migrated encoded input data. In some embodiments, the pre-stack depth migration technique may be a RTM technique, which may be a technique based on directly solving a wave equation in the time domain (instead of in the frequency domain), as previously discussed in conjunction with step 92. However, it may be appreciated that alternative techniques (e.g., Kirchhoff pre-stack depth migration, Gaussian beam migration, or wave-equation migration) for the pre-stack depth migration of step 96 may instead be implemented. In some embodiments, the migration technique utilized in step 92 is the same migration technique utilized in step 96 (i.e., the only difference is the data input being input data from step 90 and encoded input data from step 92).

In step 98, the computing system 60 may utilize the migrated encoded input data and the migrated input data in conjunction with a deconvolution operation. This deconvolution operation may result in, for example, a removal of the time encoding of the migrated encoded input data and the migrated input data to generate deconvoluted migration data. The deconvolution may, for example, provide for a reduction in migration artifacts, thus improving overall imaging. Finally, in step 100, surface offset CIGs may be estimated based upon the deconvoluted migration data and the migrated input data (i.e., based on the migrated input data and the migrated encoded input data).

In some embodiments, the input data at step 90 is receiver side based seismic input data that is encoded in step 94. This encoding in step 94 may be accomplished by the computing system 60 using different orthogonal functions for different offset bins (i.e., using predetermined orthogonal functions for different offset bins, i.e., computing system 60 chosen groups of one or more input data. Furthermore, in step 94, different encoding functions may be applied to each bin class by the computing system 60 (and, for example, the same encoding functions may be applied in step 92). In step 96, forward propagation of the source wavefield is performed by the computing system 60 and, subsequently, the computer system may backwards propagate the encoded receiver wavefield (e.g., using a wave-equation engine). In step 100, images in different surface offset bin classes may be generated by cross-correlating the receiver wavefield, the source wavefield, and the encoding function utilized to encode the particular offset bin class. In this manner, the image condition may be correlated with the orthogonal functions used for individually encoding the data input in step 94. This operation produces wave equation migrated surface offset gathers in a relatively inexpensive manner, as the migration cost is typically dominated by the wave propagation step discussed above and this step is performed once.

Figure 9A:
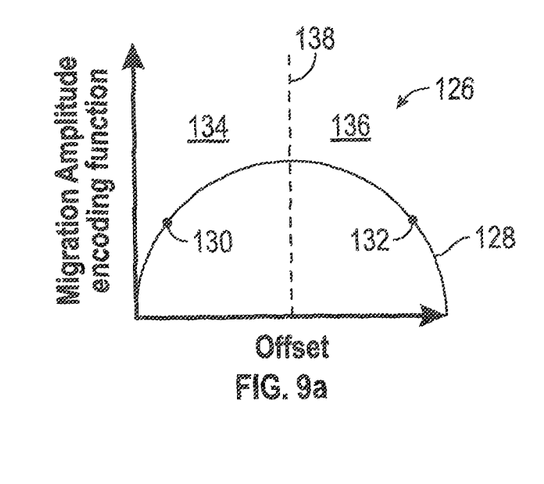
FIG. 9a illustrates a graph of a second non-monotonic function generated by utilizing separate encoding functions in amplitude and time as migration attributes in step 94 of FIG. 6, in accordance with embodiments presented herein.
Figure 9B:
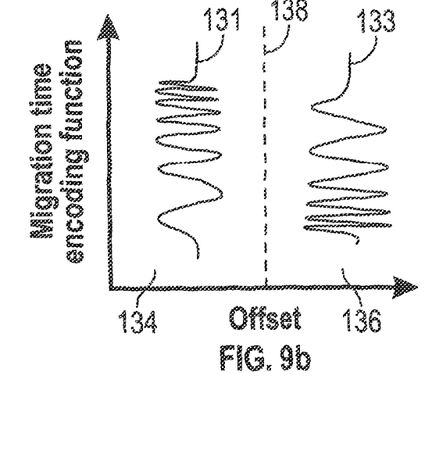
FIG. 9b illustrates a graph of a second set of time encoding functions, in accordance with embodiments presented herein.

FIG. 9a illustrates a graph 126 of another non-monotonic function 128 generated when distinct encoding functions are utilized as the migration attributes in step 94 of FIG. 6. As illustrated, the non-monotonic function 128 is not entirely non-decreasing and not entirely non-increasing with respect to the attribute (e.g., the offset) versus the migration function (e.g., the migration attribute (the encoding function dependent on time and that varies with offset) multiplied by the input data). As further illustrated, points 130 and 132 of the non-monotonic function 128 represent different offset values that have a common migration function value; a situation that cannot be present in the monotonic function 104 of FIG. 7. Point 130 may be binned (with additional points in region 134) and encoded using a first time-series encoding function, for example, function 131 of FIG. 9b and point 132 may be binned (with additional points in region 136) and encoded using a second time-series encoding function, for example, function 131 of FIG. 9b. Thus, FIG. 9b illustrates separate functions 131 and 133 (e.g., separate time encoding functions) and each offset value of the regions 134 and 136 is encoded with a separate time encoding function (e.g., functions 131 and 133, respectively), which renders the binned data generally, and more specifically points 130 and 132 separable from one another. Furthermore, regions 134 and 136 may be separated by a respective thresholds (illustrated by the vertical line 138), which may represent the offset value threshold that may be applied by the computing system 60 to determine to which offset bin input data is assigned to each respective region 134 and 136.

Accordingly, as discussed above with respect to FIGS. 8a, 8b, 9a and 9b, a shot record having traces each with a corresponding source and receiver offset is received as input data. The traces are scaled by an amplitude encoding function (examples of which are illustrated in FIGS. 8a and 9a) and convolved with the time encoding functions (examples of which are illustrated in FIGS. 8b and 9b) as the encoding process of step 94. This encoded data is migrated in conjunction with step 96 and subsequently, in step 98, the computing system 60 may perform a deconvolution operation in step 98. More particularly, migrated encoded input data is deconvolved by the respective time encoding functions (e.g., functions 115, 117, 119, and 121 or 131 and 133). This deconvolved data may also be divided by the amplitude function (e.g., the non-monotonic function 108 illustrated in FIG. 8a or the non-monotonic function 128 illustrated in FIG. 8b) so that the data is uniquely separated by offset.

While an encoding function dependent on time and that varies with offset has been discussed, it may be appreciated that alternative encoding functions may instead be utilized by the computing system 60. For example, an encoding function dependent on time only, an encoding function dependent on a cosine of a distance between a source and a receiver, an encoding function as a square value, an encoding function dependent on an azimuth, or other encoding functions, for example, that produce a non-increasing monotonic function may be utilized separate from or in conjunction with an encoding function dependent on time and that varies with offset.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. A method, comprising:
receiving, via a processor, input data based upon received seismic data;
migrating, via the processor, the input data via a pre-stack depth migration technique to generate migrated input data;
encoding, via the processor, the input data via an encoding function as a migration attribute to generate encoded input data having a migration function that is non-monotonic versus an attribute related to the input data, wherein the encoding function is dependent on time and varies with the offset;
migrating, via the processor, the encoded input data via the pre-stack depth migration technique to generate migrated encoded input data;

generating, via the processor, an estimated common image gather based upon the migrated input data and the migrated encoded input data; and generating, via the processor, a seismic image utilizing the estimated common image gather, wherein the seismic image represents hydrocarbons in a subsurface region of Earth or subsurface drilling hazards.

2. The method of claim 1, wherein the pre-stack depth migration technique comprises a reverse time migration technique.

3. The method of claim 1, wherein the attribute related to the input data is an offset as a distance between a source and a receiver utilized to generate the input data.

4. The method of claim 1, comprising:
receiving, via the processor, second input data based upon second received seismic data;
migrating, via the processor, the second input data via the pre-stack depth migration technique to generate second migrated input data;
encoding, via the processor, the second input data via a second encoding function as a second migration attribute to generate second encoded input data having a second migration function that is non-monotonic versus a second attribute related to the second input data;
migrating, via the processor, the second encoded input data via the pre-stack depth migration technique to generate second migrated encoded input data; and
generating, via the processor, a second estimated common image gather based upon the second migrated input data and the second migrated encoded input data.

5. The method of claim 4, comprising generating the seismic image utilizing the second estimated common image gather in conjunction with the estimated common image gather.

6. The method of claim 4, comprising determining, via the processor, whether the second input data is above a threshold relative to the input data.

7. The method of claim 6, comprising encoding, via the processor, the second input data via the second encoding function only when the processor determines that the second input data is above the threshold relative to the input data.

8. A tangible, non-transitory, machine-readable media, comprising instructions configured to cause a processor to:
migrate input data via a pre-stack depth migration technique to generate migrated input data;
encode the input data via an encoding function as a migration attribute to generate encoded input data having a migration function that is non-monotonic versus an attribute related to the input data, wherein the encoding function is dependent on time and varies with the offset;
migrate the encoded input data via the pre-stack depth migration technique to generate migrated encoded input data; and
generate an estimated common image gather based upon the migrated input data and the migrated encoded input data; and
generate a seismic image utilizing the estimated common image gather, wherein the seismic image represents hydrocarbons in a subsurface region of Earth or subsurface drilling hazards.

9. The tangible, non-transitory, machine-readable media of claim 8, comprising instructions configured to cause the processor to utilize a reverse time migration technique as the pre-stack depth migration technique.

10. The tangible, non-transitory, machine-readable media of claim 8, wherein the attribute related to the input data is an offset as a distance between a source and a receiver utilized to generate the input data.

11. The tangible, non-transitory, machine-readable media of claim 8, comprising instructions configured to cause the processor to:
migrate second input data via the pre-stack depth migration technique to generate second migrated input data;
encode the second input data via a second encoding function as a second migration attribute to generate second encoded input data having a second migration function that is non-monotonic versus a second attribute related to the second input data;
migrate the second encoded input data via the pre-stack depth migration technique to generate second migrated encoded input data; and
generate a second estimated common image gather based upon the second migrated input data and the second migrated encoded input data.

12. The tangible, non-transitory, machine-readable media of claim 11, comprising instructions configured to cause the processor to generate the seismic image utilizing the second estimated common image gather in conjunction with the estimated common image gather.

13. The tangible, non-transitory, machine-readable media of claim 11, comprising instructions configured to cause the processor to determine whether the second input data is above a threshold relative to the input data.

14. The tangible, non-transitory, machine-readable media of claim 13, comprising instructions configured to cause the processor to encode the second input data via the second encoding function only when the processor determines that the second input data is above the threshold relative to the input data.

15. A device, comprising:
a memory configured to store instructions;
a processor coupled to the memory and configured to execute the instructions, which cause the device to:
migrate input data via a pre-stack depth migration technique to generate migrated input data;
encode the input data via an encoding function as a migration attribute to generate encoded input data having a migration function that is non-monotonic versus an attribute related to the input data, wherein the encoding function is dependent on time and varies with the offset;
migrate the encoded input data via the pre-stack depth migration technique to generate migrated encoded input data; and
generate an estimated common image gather based upon the migrated input data and the migrated encoded input data; and
generate a seismic image utilizing the estimated common image gather, wherein the seismic image represents hydrocarbons in a subsurface region of Earth or subsurface drilling hazards.

16. The device of claim 15, wherein the instructions further cause the device to:
migrate second input data via the pre-stack depth migration technique to generate second migrated input data;
encode the second input data via a second encoding function as a second migration attribute to generate second encoded input data having a second migration function that is non-monotonic versus a second attribute related to the second input data;
migrate the second encoded input data via the pre-stack depth migration technique to generate second migrated encoded input data;

generate a second estimated common image gather based upon the second migrated input data and the second migrated encoded input data; and generate the seismic image utilizing the second estimated common image gather in conjunction with the estimated common image gather.

* * * * *